(12) United States Patent
Ikeda

(10) Patent No.: US 6,302,245 B1
(45) Date of Patent: *Oct. 16, 2001

(54) DRUM BRAKE DEVICE

(75) Inventor: Takashi Ikeda, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,345

(22) Filed: Apr. 21, 1999

(30) Foreign Application Priority Data

Apr. 22, 1998 (JP) .................................................. 10-112217

(51) Int. Cl.$^7$ ..................................................... F16D 51/00
(52) U.S. Cl. ........................... 188/79.51; 188/75; 188/78; 188/325; 188/328
(58) Field of Search ..................................... 188/325, 328, 188/75, 79.51, 78, 79.55, 79.62, 106 F

(56) References Cited

U.S. PATENT DOCUMENTS

| 3,575,266 | * | 4/1971 | Sitchin | 188/106 |
|---|---|---|---|---|
| 4,249,646 | * | 2/1981 | Roberts | 188/328 |
| 4,678,067 | * | 7/1987 | Thompson | 188/328 |
| 5,000,297 | * | 3/1991 | Shaw | 188/156 |
| 5,002,159 | * | 3/1991 | Brix | 188/2 D |
| 5,167,304 | * | 12/1992 | Capek | 188/325 |
| 5,377,793 | * | 1/1995 | Livingston | 188/331 |
| 5,630,486 | * | 5/1997 | Maligne | 188/328 |
| 5,720,367 |   | 2/1998 | Evans . |   |
| 6,003,645 | * | 12/1999 | Asai | 188/328 |
| 6,065,571 | * | 5/2000 | Ikeda | 188/79.61 |
| 6,082,505 | * | 7/2000 | Asai | 188/79.54 |

FOREIGN PATENT DOCUMENTS

| 0 836 027 A | 4/1988 | (EP) . |
| 0 800 014 A | 10/1997 | (EP) . |

* cited by examiner

*Primary Examiner*—J. J. Swann
*Assistant Examiner*—David Divine
(74) *Attorney, Agent, or Firm*—Liniak, Berenato, Longacre & White

(57) ABSTRACT

A drum brake device which reduces the amount of non-effective stroke (play) and prevents noise for the long period of time. The first strut 12 of an automatic shoe clearance adjustment device is provided adjacent to the service brake actuator 8 and between both brake shoes 2 and 3. The parking brake actuator 19 is provided adjacent to the anchor block 9. The central region of the pivot lever 11 is rotatably supported with the central region of one brake shoe 2 as the fulcrum. Both ends of the pivot lever 11 functionally engage with the first strut 12 and the second strut 22 of the parking brake actuator 19 which comprises an automatic stroke adjustment device automatically adjust the stroke. When the brake shoes are opened by the service brake operation, one end 11c of the pivot lever 11 is elastically supported by the first strut 12 of the automatic shoe clearance adjustment device, and the spring applies spring force so that both pivot lever 11 and first strut 12 operate together with one brake shoe 2.

12 Claims, 10 Drawing Sheets

Fig. 1

DRUM BRAKE DEVICE

BACKGROUND OF INVENTION

This invention relates to a drum brake device which functions as a leading-trailing (LT) type when the service brake is operated and functions as a duo-servo (DS) type when the parking brake is operated. More specifically, the invention relates to an improvement in a drum brake device to improve the operation feeling of the parking brake actuator.

For example, this type of drum brake device is disclosed in Australian Patent Number AU-B1-53 491/70 and in U.S. Pat. No. 5,275,260. Both conventional drum brake devices are basically the same in their fundamental function, and they are explained with reference to FIG. 10.

The drum brake device in FIG. 10 comprises a pair of brake shoes b, c mounted on a back plate a, an anchor block d provided between respective ends of the pair of brake shoes b, c, a hydraulic cylinder g provided between respective other ends of the pair of brake shoes b, c, a parking brake lever j pivoted at one end i of one brake shoe b, an idle lever k oscillatably pivoted on the other brake shoe c, and rods l, m provided between both brake shoes b, c, wherein one end n of rod l engages the parking brake lever j and the other end o engages the idle lever k, one end p of rod m engages one brake shoe b and the other end q engages the other brake shoe c and the idle lever k.

Operation of the above-described drum brake device is explained next.

In service brake operation, when the hydraulic cylinder g is pressurized, both brake shoes b, c open with the point of abutment against the anchor block d as the fulcrum and frictionally engage with the brake drum, not shown in the diagram, thereby braking as a LT type brake.

In parking brake operation, when the parking brake lever j is pulled in the direction of arrow X, an operational force is transferred to the one rod l, the idle lever k, and the other rod m in order, thereby opening one brake shoe b to frictionally engage with the brake drum. Then, the idle lever k moves away from a center of the brake drum device such that a point of abutment of the idle lever k is against the rod m as the fulcrum, and the pivot point of the idle lever k presses the other brake shoe c in the direction of Y to frictionally engage with the brake drum. Further, a reaction force of the parking brake lever j in the direction of arrow Z affects on one end i of one brake shoe b.

If at this time, a rotational force is applied to the brake drum in the direction of arrow R as when the vehicle is stopping on an uphill or a downhill slope, the friction force of one brake shoe b is transferred to the other rod m, whereby its other end q presses against the other brake shoe c, supported by the anchor block d, in a duo-servo braking action. If the rotational force is applied to the brake drum in the direction opposite to the direction of arrow R, the friction force of the other brake shoe c is transferred to the other rod m, whereby its one end p is pressed against brake shoe b, supported by the anchor block d, in the same duo-servo braking action as above.

As is evident from this parking brake operation, if the other end q of the other rod m abuts against the idle lever k and a clearance exists between the other end q and the other brake shoe c, then when the shoe c rotates in the direction opposite to the direction of arrow R, the position of the hydraulic cylinder g is repelled to the amount equivalent to the clearance. That is, the brake pedal is repelled which is not only disconcerting to the driver, but the pedal stroke increases in the next brake pedal application. Conversely, if the end q of the other rod m abuts against the other brake shoe c and a clearance exists between the other end q and the idle lever k, then the stroke of the parking brake lever j increases by an amount equivalent to this clearance; that is, the stroke of the hand lever increases. From these perspectives, it is preferable that the clearance between the other end q of the other rod m and either the other brake shoe c or the idle lever k be as small as possible.

FIG. 11 illustrates the concept of an automatic shoe clearance device which is installed in the drum brake device of U.S. Pat. No. 5,275,260. A bent end y of an adjustment lever r is pivotable on the web of the brake shoe c. One end of an upper arm s is connected to a groove of an upper strut t for engagement therewith. Another arm is connected to a star wheel u of the upper strut t. A spring w, stretched between the adjustment lever r and the pivot lever v, energizes the adjustment lever r in the counterclockwise direction, with the end y as the fulcrum.

Should the brake lining be worn causing the two brake shoes b, c to open by more than a prescribed value when the service brake is applied, the upper arm causes the star wheel u to rotate to automatically extend the entire length of the upper strut t, thereby maintaining a constant clearance between the brake shoes b, c and the brake drum z.

The drum brake device as described above has need of improvement in the following areas:

Both conventional devices described above have a problem in that the cumulative effect of the tolerances of each component for the parking brake requires a clearance between the idle lever k and one rod l or the other rod m. This generates a partially ineffective stroke or play in the system.

Moreover, as the lining of the other brake shoe c is gradually worn, there is a gradual shift in the point at which the other rod m contacts with the brake shoe c or the idle lever k. That is, as shown in FIG. 10, the amount of displacement δ (amount of lining wear) at the brake center of the brake shoe c (pivot point of the brake shoe c and the idle lever k), and the amount of displacement δc and δk of the brake shoe c and idle lever k respectively at the point of the contact with the other rod m are defined as follows:

$$\text{Displacement } \delta c \text{ of the brake shoe } c = \frac{H_1 + H_2}{H_1} \times \delta \quad \text{Formula 1}$$

$$\text{Displacement } \delta k \text{ of the idle lever } k = \frac{H_2 + H_3}{H_3} \times \delta \quad \text{Formula 2}$$

$H_1$: Distance from the anchor d to the brake center (pivot point of the brake shoe c and the idle lever k)

$H_2$: Distance from the brake center to the other rod m $H_3$: Distance from the brake center to one rod l δ: Amount of displacement (amount of lining wear)

In this case, $H_3$ is considerably smaller than $H_1$; hence, the displacement δk of the idle lever k will be considerably larger than the displacement δc of the brake shoe c. As a result, as the lining wears, the parking brake lever j stroke increases and this increase is disconcerting to the driver. This also may cause the parking brake lever j to interfere with other components, which influences the effectiveness of the brake. Moreover, consideration of the parking brake lever j stroke, the size of the brake shoe, the brake offset, etc., is restricted, which creates a limitation in its design.

Moreover, the respective brake shoes b, c when applying the parking brake are moved so that the adjacent two ends of the brake shoes b, c rotate in the direction to spread apart. In other words, the adjacent ends of the respective brake shoes b, c separate from the anchor block d simultaneously. In this state, if the brake drum starts to rotate together with the wheel, both brake shoes b, c and rods l, m, etc., also rotate together, whereupon one or the other brake shoe collides against the anchor block d. The noise so generated is disconcerting to the driver. Additionally, this impact load is applied repeatedly on the anchor block d; therefore, the strength of the components becomes critical.

In the conventional device as disclosed in Australian Patent Number AU-B1 53 491/79, the cumulative effect of the tolerances of each component will be such that the idle lever k could abut against the other rod or play could be generated. At the very least, play will be generated when the service brake is applied. Accordingly, the idle lever k could vibrate creating a strange noise when the vehicle is in motion or the foot brake is applied. This noise can be disconcerting to the driver.

OBJECT OF THE INVENTION

This invention was devised to resolve the aforementioned problems by providing a drum brake device which maintains a stable parking brake stroke during the life span of the lining, which avoids the causing of a strange noise, and which eliminates the problem of imposing an impact load on the components to enable reduction of the weight of the parts.

More specifically, it is an object of the invention to provide a drum brake device which comprises certain specific structure. A pair of brake shoes are provided to face each other on a back plate. A service brake actuator, activated upon operation of a service brake, is provided between one adjacent ends of the pair of brake shoes. An anchor is provided between the other adjacent ends of the pair of brake shoes. A pivot lever is pivotally mounted at the pivot point on a central region of one brake shoe as the fulcrum. An automatic shoe clearance adjustment device is provided in order to automatically adjust the clearance between the brake drum and the brake shoes and has a first strut between the pair of brake shoes adjacent to the service brake actuator. A parking brake actuator, activated upon operation of a parking brake and having a strut, is provided adjacent to the anchor. The central region of the pivot lever is rotatably supported having the pivot point at the central region of the one brake shoe as the fulcrum. One end of the pivot lever functionally engages the first strut of the automatic shoe clearance adjustment device and the other end engages the second strut of parking brake actuator. An automatic stroke adjustment device is provided in the parking brake actuator to automatically adjust the stroke of the parking brake actuator. A spring means is provided so that the pivot lever can be elastically supported by the first strut of the automatic shoe clearance adjustment device and so that the pivot lever and the first strut of the automatic shoe clearance adjustment device can operate together with the one brake shoe when the service brake operates to spread open the brake shoes.

This invention is a drum brake device as above, wherein the spring means comprises a first spring energizing one end of the pivot lever in the direction to be elastically supported by the strut of automatic shoe clearance adjustment device, and a second spring energizing the first strut of automatic shoe clearance adjustment device in the direction toward the one brake shoe against the force of the first spring, therefore the pivot lever operates so as to open together with the one brake shoe.

This invention further is a drum brake device as above, wherein an adjustment lever is rotatably pivoted on the other brake shoe. The adjustment lever senses an excessive opening of the pair of brake shoes in service brake operation and automatically extends the strut of the automatic shoe clearance adjustment device, and the second spring, which energizes the strut of the automatic shoe clearance adjustment device in the direction toward the one brake shoe, also energizes the adjustment lever to rotate.

This invention still further is a drum brake device as above, wherein an opening resistance force being applied to one brake shoe with the central region of the pivot lever as the fulcrum, when parking brake in operation, is designed so that the opening resistance force is larger on the other end of the brake shoe than the one end.

This invention still further is a drum brake device as above, wherein the moment of at least one return spring extended between the pair of brake shoes with the central region of the pivot lever as the fulcrum, is designed so that the moment of the other side of the brake shoe is larger than the one side.

This invention yet further is a drum brake device as above, wherein a protuberance is integrally formed either on the central region of the pivot lever or the central region of one brake shoe by a press, and the protuberance is rotatably pivoted in a hole formed in either one of the central region of the one brake shoe or the central region of the pivot lever, respectively.

BRIEF DESCRIPTION OF THE DRAWINGS

The above and other object and the attendant advantages of the present invention will become readily apparent by reference to the following detailed description when considered in conjunction with the accompanying drawings wherein:

FIG. 1 is a plan view of the drum brake device of a first embodiment of this invention;

DETAILED DESCRIPTION OF PREFERRED EMBODIMENTS

Figure 1:
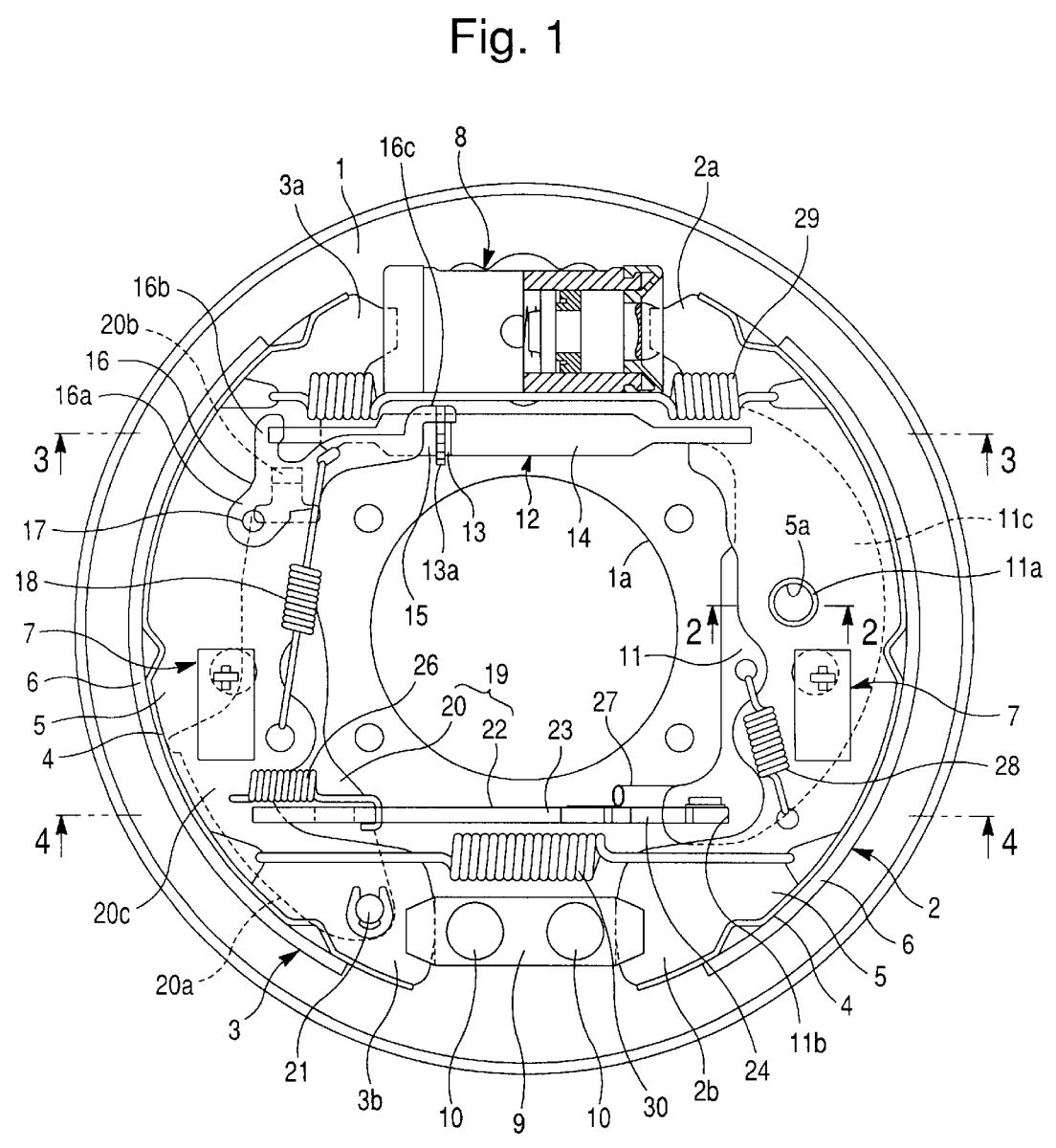
Figure 2A:
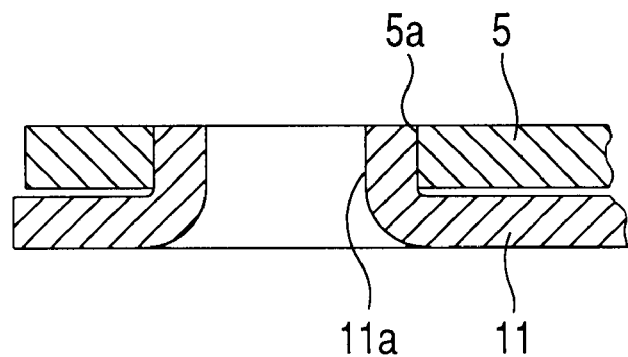
FIG. 2 is a cross-section view of FIG. 1 taken along the line II—II.

The overall configuration of the first embodiment is shown in FIGS. 1–5.

A central hole 1a of the back plate 1 is provided to be freely positioned over the vehicle axle, and is affixed to a stationary part of the vehicle by bolts.

A pair of brake shoes 2, 3 are provided, each comprising a shoe rim 4, a shoe web 5 joined to the rim 4 to form a "T" in cross section, and a lining 6 affixed around the perimeter of the shoe rim 4. The brake shoes 2, 3 are each mounted on top of the back plate 1 by a shoe-hold mechanism 7, 7 comprised of a known plate spring and pin.

A service brake actuator 8, activated when the service brake is applied, is provided between one pair of adjacent ends 2a, 3a of the pair of oppositely-facing shoes 2, 3, and is affixed to the back plate 1 with bolts or other hardware. A known hydraulic wheel cylinder is widely used as an actuator, but an air wheel cylinder can be used.

An anchor block 9 is provided between the other pair of adjacent ends 2b, 3b of the two brake shoes 2, 3. The anchor block 9 is normally affixed on top of a raised segment of the back plate 1 by two rivets 10, 10 but it can be welded if desired. Moreover, an anchor pin can be used in place of the rectangular plate.

A pivot lever 11 is set under the shoe web 5 of brake shoe 2 and is rotatably pivoted at a central region of the shoe web 5. The pivot lever 11 is engageably extended between a first strut (upper strut) 12 and a plate-shaped second strut (lower strut) 22 as shown in FIG. 1.

Figure 2B:
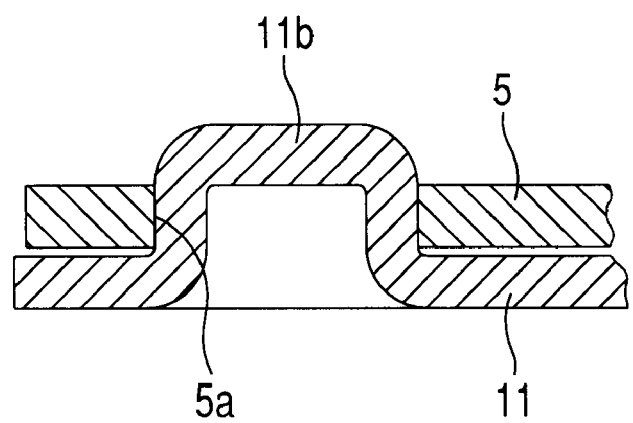

The pivot structure of the pivot lever 11 is explained next. FIG. 2(A) illustrates an example of a protuberance 11a, integrally formed as a burr with a press in the central region of the pivot lever 11 which slips into the hole 5a bored in the shoe web 5 of one brake shoe 2. FIG. 2(B) illustrates a constricted protuberance 11b, formed as drawing with a press, which slips into the hole 5a. As another pivot structure, a protuberance is formed on the shoe web 5 of brake shoe 2, and a hole may be formed on the pivot lever 11 to be rotatably pivotable on the shoe web 5 of brake shoe 2. Otherwise, a separate pin, without forming a protuberance, may be easily used to support the pivot lever 11 so as to be pivotable on the shoe web 5 of one brake shoe 2.

Figure 3:
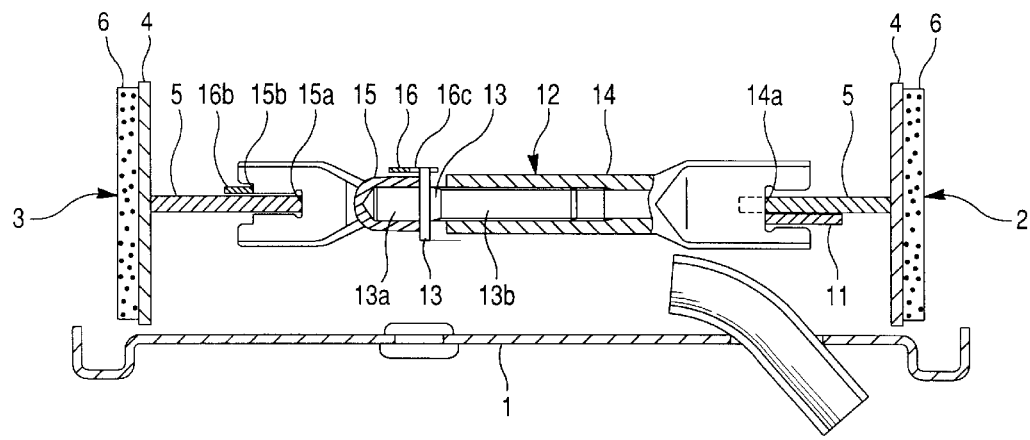
FIG. 3 is a cross-section view of FIG. 1 taken along the line III—III.

FIGS. 1 and 3 illustrate an example of an incremental type automatic shoe clearance adjustment device activated when in a service brake operation.

A shoe clearance adjustment device can comprise a known screw type first strut 12 adjacent to the wheel cylinder 8 and an adjustment lever 16, etc. The first strut 12 is expandably provided between the brake shoes 2 and 3. The adjustment lever 16 can be installed on the other brake shoe 3. As shown in FIG. 3, the first strut 12 comprises an adjustment bolt 13, an adjustment nut 14, and an adjustment sleeve 15. A toothed adjustment wheel 13a is integrally formed in a central region of the adjustment bolt 13. A first axle portion 13b with male screw threading at the right side is screwed into the adjustment nut 14. A second axle portion 13c at the left side rotatably engages the adjustment sleeve 15. A thin plate is formed on the ends of the adjustment nut 14 and the adjustment sleeve 15 to form notched grooves 14a, 15a. The bottom of notched groove 14a of the adjustment nut 14 abuts against the shoe web 5 of brake shoe 2, and the bottom of notched groove 15a of the adjustment sleeve 15 abuts against the shoe web 5 of the other brake shoe 3.

A base portion 16a of the adjustment lever 16 is rotatably pivoted at a spring pin 17 vertically installed in the shoe web 5 of the brake shoe 3. As shown in FIG. 3, one arm 16b of the adjustment lever 16 abuts against a stepped surface 15b of the notched groove 15a of the adjustment sleeve 15. The other arm 16c engages with the toothed adjustment wheel 13a of the adjustment bolt 13.

A shoe clearance adjustment spring 18 extends between the adjustment lever 16 and the shoe web 5 of the brake shoe 3 and gives a clockwise spring force to the adjustment lever 16 with the spring pin 17 as the fulcrum.

The parking brake actuator 19, activated when the parking brake is applied, comprises a forward-pull type brake lever 20, the second strut 22, etc. The brake lever 20 is superimposed under the shoe web 5 of the other brake shoe 3. A base portion 20a of the brake lever 20 is rotatably provided at the other end 3b of the other brake shoe 3 with a pin 21 as the fulcrum. A groove is formed on a free end 20b of the brake lever 20 to hook the parking brake cable, not shown in the diagram, for remotely controlling the brake lever 20. A stopper 20c restricts the returning position of the brake lever 20 by abutting against the inner surface of the shoe rim 4 of the other brake shoe 3 when the parking brake is not in operation.

The second strut 22 is a one-shot type with an automatic stroke adjustment device which automatically adjusts the clearance between the pivot lever 11 and the brake lever 20. The second strut 22 comprises an adjustment plate 23, a bell crank lever 24, two springs 26, 27, etc. A pin 25 is provided to be freely positioned in an elliptical hole bored in the other end 23c of the adjustment plate 23 and is vertically installed on the central region of the bell crank lever 24 so as not to separate each other.

The second strut 22 is explained with reference to FIG. 4. The bottom of a notched groove 23a is formed at one end of the adjustment plate 23. Small short teeth 23b are formed at a central region of the adjustment plate 23.

The central region of the bell crank lever 24 is pivotably supported on the other end 23c of the adjustment plate 23 with the pin 25 as the fulcrum and movably supported lengthwise along the plate face of the adjustment plate 23. A fan-shaped arm 24a on one end of the bell crank lever 24 has small, short teeth 24b provided around its perimeter which mesh with the small short teeth 23b of the adjustment plate 23. The other arm 24c having a cam surface is provided to be freely positioned with a clearance of δ1 in a rectangular hole 11d formed in the pivot lever 11.

The first stroke adjustment spring 26 is stretched between the shoe web 5 of the brake shoe 3 and the adjustment plate 23. The quadrant spring 27 is stretched between the adjustment plate 23 and the pin 25. The mounting load of the stroke adjustment spring 26 is provided to be greater than that of the quadrant spring 27.

As shown in FIG. 1, an anti-rattle spring 28 is stretched between the shoe web 5 of the brake shoe 2 and the pivot lever 11 and provides counterclockwise spring force to the pivot lever 11 with the protuberance 11a as the fulcrum. The spring force energizing the first strut 12, created by this anti-rattle spring 28, is designed to be smaller than the spring force energizing the first strut 12 by the shoe clearance adjustment spring 18 but larger than the operational force of the anti-rattle spring 28 energizing the rectangular hole 11d of the pivot lever 11 is designed to be longer than the operation force of the quadrant spring 27 energizing the rectangular hole 11d of the pivot lever 11.

Figure 5:
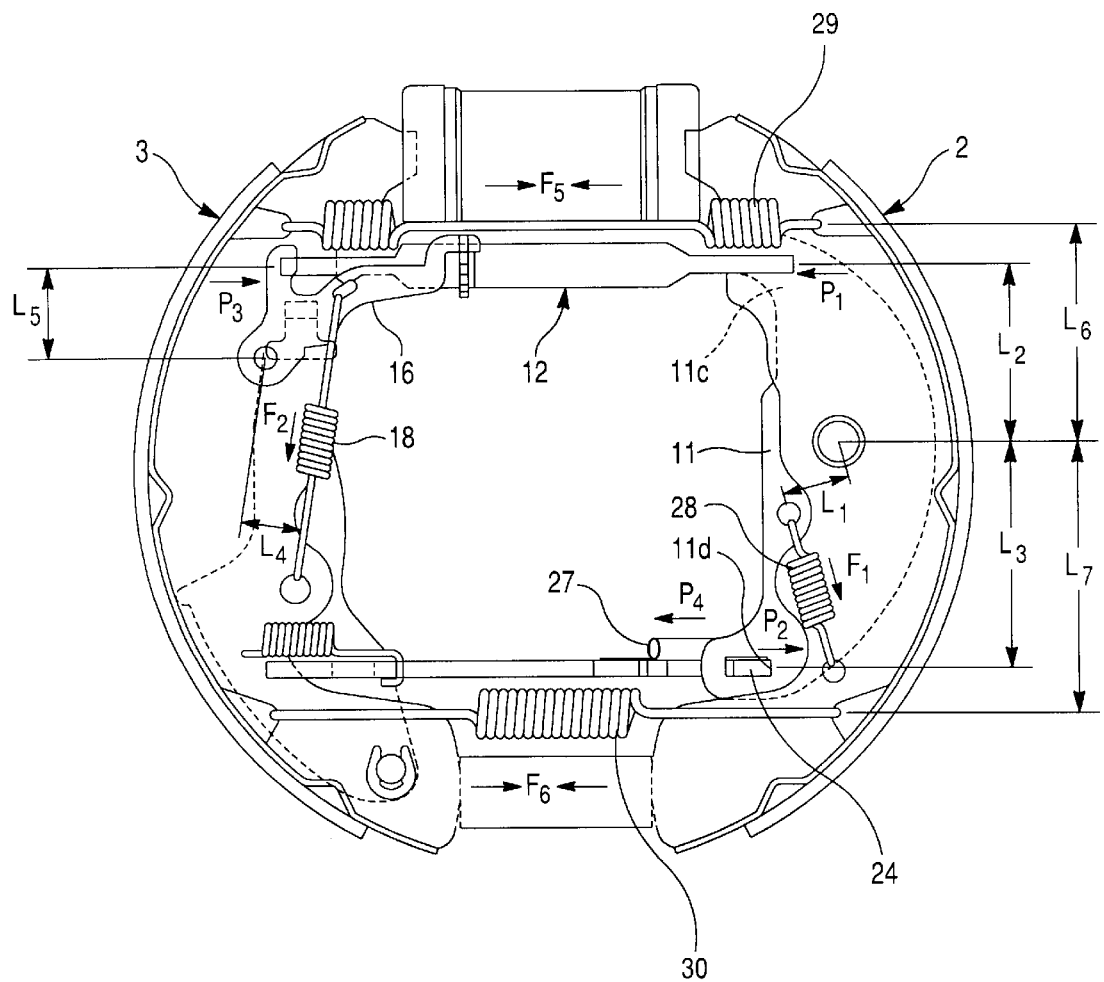
FIG. 5 is a model view of the drum brake device for the explanation of the moment relation of the automatic shoe clearance adjustment device.

That is, as shown in FIG. 5, the operation force $P_1$ is the force created by the anti-rattle spring 28 affecting the upper portion 11c of the pivot lever 11. The operation force $P_2$ is the force created by the anti-rattle spring 28 affecting the lower portion of the pivot lever 11 at the rectangular hole 11d. The operation force $P_3$ is the force created by the shoe clearance adjustment spring 18 affecting the first strut 12. Then, each operation force $P_1$–$P_3$ may be described by the following Formulas 3–5.

$$\text{Operation force } P_1 \text{ of the upper portions of the pivot lever} = \frac{L_1}{L_2} \times F_1 \quad (3)$$

$$\text{Operation force } P_2 \text{ of the lower portion of the pivot lever} = \frac{L_1}{L_3} \times F_1 \quad (4)$$

$$\text{Operation force } P_3 \text{ of the left portion of the first strut} = \frac{L_4}{L_5} \times F_2 \quad (5)$$

$F_1$: mounting load of the anti-rattle spring 28
$F_2$: mounting load of the shoe clearance adjustment spring 18
$L_1$: distance from the pivot point of the pivot lever 11 to the operational line of the anti-rattle spring 28
$L_2$: distance from the pivot point of the pivot lever 11 to the abutting point of the first strut 12
$L_3$: distance from the pivot point of the pivot lever 11 to the abutting point of the bell crank lever 24
$L_4$: distance from the pivot point of the adjustment lever 16 to the operation line of the shoe clearance adjustment spring 18
$L_5$: distance from the pivot point of the adjustment lever 16 to the abutting point of the first strut 12

Further, if the operational force $P_4$ is the force created by quadrant spring 27 affecting the bell crank lever 24, the relational formula for the respective operational force, $P_1 < P_3$ and $P_2 > P_4$ is satisfied.

A first shoe return spring 29 is stretched between respective ends 2a, 3a of brake shoes 2, 3 adjacent to the service brake actuator 8.

A second shoe return spring 30 is stretched between other respective ends 2b, 3b, of the brake shoes 2, 3. The mounting load of the second return spring 30 is designed so that the 2b, 3b ends of brake shoes 2, 3 adjacent to the anchor block 9 do not spread apart during the parking brake operation. That is, as shown in FIG. 5, if $F_5$ is a mounting load of the first shoe return spring 29; $F_6$ is a mounting load of the second shoe return spring 30; $L_6$ is a distance from the pivot point of the one brake shoe 2 with the pivot lever 11 to the first shoe return spring 29; and $L_7$ is a distance from the pivot point of the one brake shoe 2 with the pivot lever 11 to the second shoe return spring 30, the moment affecting one brake shoe 2 is to be $F_5 \times L_6 < F_6 \times L_7$.

The operation of the drum brake device is explained next.

For instance, during service brake operation when the driver steps on the brake pedal (not shown in the diagram), the service brake actuator 8 is pressurized and extends to open the ends 2a, 3a of both brake shoes 2, 3 with the point of abutment between the other ends 2b, 3b and the anchor block 9 as the fulcrum. This forces the linings 6, 6 against the rotating brake drum (not shown in the diagram), and the friction so created will brake the vehicle. At this time, either brake shoe 2 or the brake shoe 3 has a self-servo property while the other does not; hence, the drum brake device functions as a stable leading-trailing type.

The operation of the parking brake is explained next, with each component turning in the direction as shown in FIG. 1.

When the parking brake cable (not shown in the diagram) is pulled, the free end 20b of the brake lever 20 of the parking brake actuator is pulled to the right. At this point, the brake lever 20 rotates clockwise with the pivot point 20a as the fulcrum to press the second strut 22 adding to the lever-ratio.

When the bell crank lever 24 of the second strut 22 presses the rectangular hole 11d at the other end of the pivot lever 11, the bell crank lever 11 rotates counter-clockwise with the protuberance 11a as the fulcrum, and the force created is transferred to the notched groove of the other brake shoe 3 via the first strut 12 of the automatic shoe clearance adjustment device. Then, one end 3a of the other brake shoe 3 opens with the point of abutment between the other end 3b and the anchor block 9 as the fulcrum to press the brake drum.

Further, pulling the brake lever 20 creates the counter-clockwise operation force on the pivot lever 11 with the point of abuttment between the upper portion 11c of the pivot lever 11 and the first strut 12 as the fulcrum, and this operation force is transferred to the hole 5a of one brake shoe 2 via the protuberance 11a.

At this time, since the moment due to the mounting load of the second return spring 30 is large, brake shoe 2 opens with the point of abuttment between the other end 2b and the anchor block 9 as the fulcrum to press the brake drum.

If the clockwise rotation force is applied to the brake drum, the frictional force of the other brake shoe 3 is transferred to brake shoe 2 via the first strut 12, and the other end 2b of one brake shoe 2 is supported by the anchor block 9 to apply the braking force. Accordingly, both brake shoes 2, 3 have self-servo property; therefore, this drum brake functions as a highly effective duo-servo brake device.

In addition, if a counter-clockwise rotational force is applied to the brake drum, the friction force of brake shoe 2 is transferred to the other brake shoe 3 via the first strut 12, and the other end 3b of the other brake shoe 3 is supported by the anchor block 9; therefore, this drum brake functions as a duo-servo type brake as above.

As is evident from the above-discussion, the brake shoes 2, 3 do not separate from the anchor block 9 until the brake drum rotates when the parking brake is applied as both brake shoes 2, 3 do not separate from the anchor block 9 at any time when the service brake is applied. The effect is obviously the same when both brakes are applied together.

Accordingly, the other adjacent end 2b or 3b of the brake shoe 2 or 3 respectively does not collide with the anchor block 9 to generate any noise, nor is an impact load applied to the anchor block 9. That is, the effect differs from the conventional devices, in which when the parking brake is applied, the brake shoes 2, 3 will open completely wherein the other adjacent ends 2b, 3b will separate from the anchor block 9, thus generating a noise when the brake drum starts to rotate and applying an impact load to the anchor block 9.

In FIGS. 1 and 3, when the service brake is applied and the two brake shoes 2, 3 spread open, the first strut 12 moves almost together with one brake shoe 2 by the spring force of the shoe clearance adjustment spring 18. At this time, the other arm 16c of the adjustment lever 16 as shown in FIG. 1 rotates clockwise with the spring pin 17 as the fulcrum according to the extent that the spring pin 17 moves plus the amount that the strut 12 moves.

At this point, if the linings 6, 6 are worn, and the degree of rotation of the other arm 16c of the adjustment lever 16 exceeds the intertooth pitch of the toothed adjustment wheel 13a of the adjustment bolt, the adjustment bolt 13 is rotated to be screwed out of the adjustment nut 14. This automatically adjusts the clearance between the brake drum and the linings 6, 6 to maintain a constant clearance. That is, this maintains a constant operation stroke when the service brake is in operation, thereby keeping the fine operation feeling of the driver.

Figure 4:
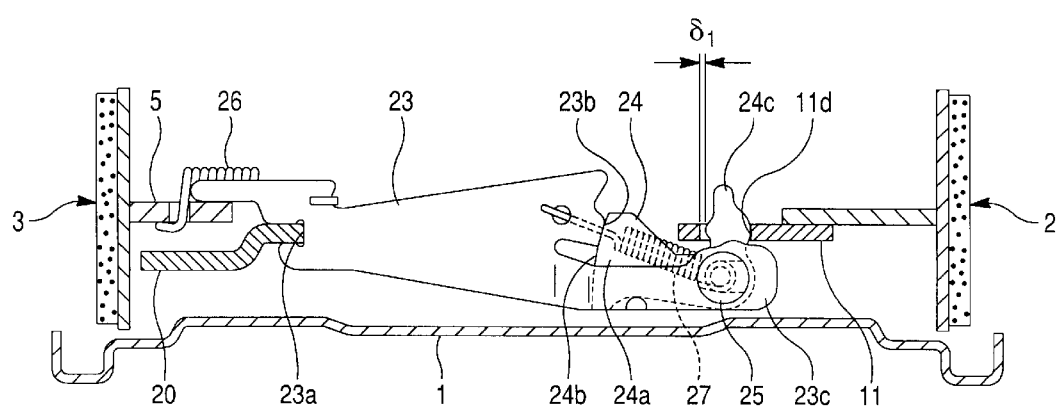
FIG. 4 is a cross-section view of FIG. 1 taken along the line IV—IV.

In FIGS. 1 and 4, when both brake shoes 2, 3 open with the service brake operation, the second strut 22 follows the movement of the brake shoe 3 due to the spring force of the stroke adjustment spring 26, and because of the spring force of the brake adjustment spring 18 and the anti-rattle spring 28, the upper end 11c of the pivot lever 11 elastically abuts the first strut 12 while the pivot lever 11 moves integrally with brake shoe 2.

At this time, normally, the parking brake cable is connected to free end 20b of the brake lever 20 with a slight play. Thus, the adjustment plate 23 moves integrally with the brake shoe 3 and the brake lever 20 by the spring force of the stroke adjustment spring 26.

Further, even if the parking brake cable is arranged without play or with its free end 20b slightly pulled, the bottom of the notched groove 23a of the adjustment plate 23 continues to abut against the brake lever 20 and only the stroke adjustment spring 26 is stretched. Thus, no adverse effect to the function is expected.

At this point, if the linings 6, 6 of both brake shoes 2, 3 are worn and the amount of opening exceeds the amount of the clearance δ1 of the other arm 24c of the bell crank lever 24 and the height of the short teeth 24b of the bell crank lever 24, the bell crank lever 24 rotates with the pin 25 as the fulcrum to extend the second strut 22 for one pitch. The clearance δ1 between the other arm 24c of the bell crank lever 24 and the rectangular hole 11d of the pivot lever 11 is maintained constantly while the pivot lever 11 abuts against the first strut 12 while abutting against the first strut 12.

Accordingly, as in the conventional devices where when the linings 6, 6 are worn out, a difference between the amount of displacement of the notched groove of one brake shoe and the amount of displacement of inner end surface of the upper end 11c of the pivot lever 11 is created. This difference is taken up by the stroke adjustment. The stroke of the brake lever 20 does not increase to give disconcerting operation feeling to the driver or to interfere with other parts.

In addition, the spring force of the anti-rattle spring 28 is constantly applying on the pivot lever 11 to eliminate a noise possibly generated when either in service brake operation or not in service brake operation. Therefore, this invention eliminates any discomfort or anxiety for the driver in this regard.

Further, as is evident from the above-described structure, the automatic stroke adjustment device absorbs all tolerance of the components relating to the parking brake, and ineffective stroke or play of the brake lever 20 is maintained to be less than the height of the small short teeth 24b of the bell crank lever 24. Thus, the device does not require no more than necessary precision of the components. This also increases machinability of the components and reduces the cost.

Figure 6:
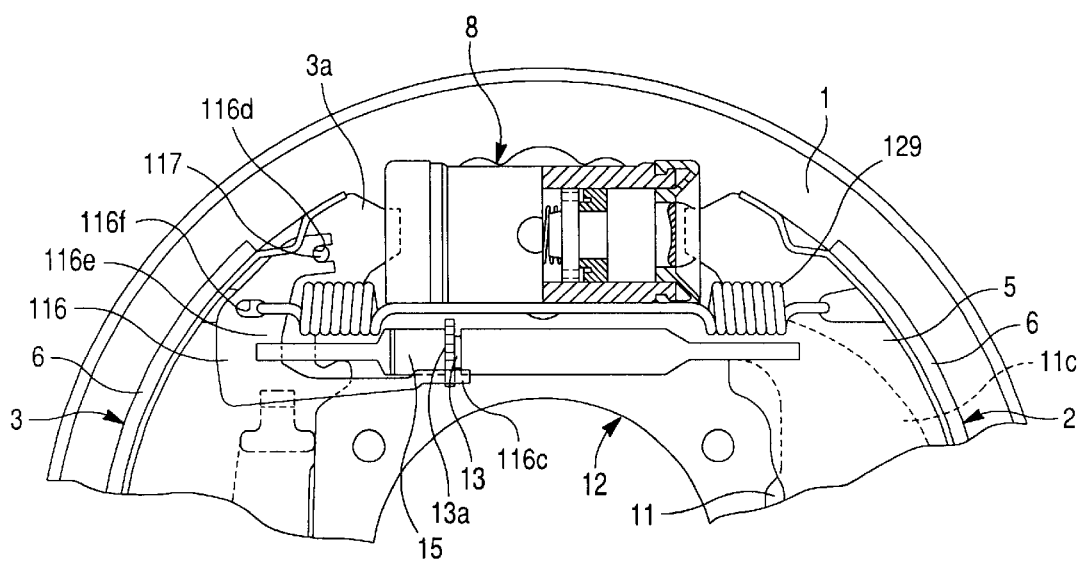
FIG. 6 is a plan view of the vital portion of the drum brake device for the explanation of the modification of automatic shoe clearance adjustment device.

FIG. 6 illustrates a second embodiment of the invention wherein there is a modification of automatic shoe clearance adjustment device having an adjustment spring serves as the first return spring 129. Otherwise, all other components are virtually the same as in the first embodiment, and are identified with the same symbol whereby an explanation is omitted here.

The adjustment lever 116 is a slightly obtuse L shape and the notched groove 116d formed on one end of the adjustment lever 116 rotationally engages with the pin 117 vertically provided adjacent to the one end 3a of the brake shoe 3. A middle segment 116e abuts against the stepped surface of the adjustment sleeve 15, and the other arm 116c engages with the toothed adjustment wheel 13a of the adjustment bolt 13.

The first return spring 129 stretched between the shoe web 5 of brake shoe 2 and a hole 116f bored at the middle segment 116e of the adjustment lever 116, applies the returning force to the brake shoe 3 via the pin 117, and applies the counter-clockwise spring force to the adjustment lever 116 with the pin 117 as the fulcrum. Therefore, the number of components may be reduced.

Furthermore, the operational force of the first return spring 129 to the first strut 12 is larger than the operational force energizing the upper end 11c of the pivot lever 11 by the above-discussed anti-rattle spring 28.

When the service brake is applied and the two brake shoes 2, 3 spread open, the first strut 12 follows the movement of brake shoe 2 due to the spring force of the first return spring 129.

At this point, the other arm 116c of the adjustment lever 116 rotates counter-clockwise with the pin 117 as the fulcrum according to the extent that the pin 117 moves plus the first strut 12 moves. If the linings 6, 6 are worn and the degree of rotation exceeds the intertooth pitch of the toothed adjustment wheel 13a, the automatic clearance adjustment operation as described in the first embodiment is conducted.

A third embodiment of the invention having a modified automatic stroke adjustment device to automatically adjust the stroke of the brake lever 20, i.e., an incremental type automatic adjustment device, is explained with reference to FIGS. 7–9. The components which have the same function as the previous automatic shoe clearance adjustment device in the second embodiment is identified with a 200-series of numbers.

Figure 7:
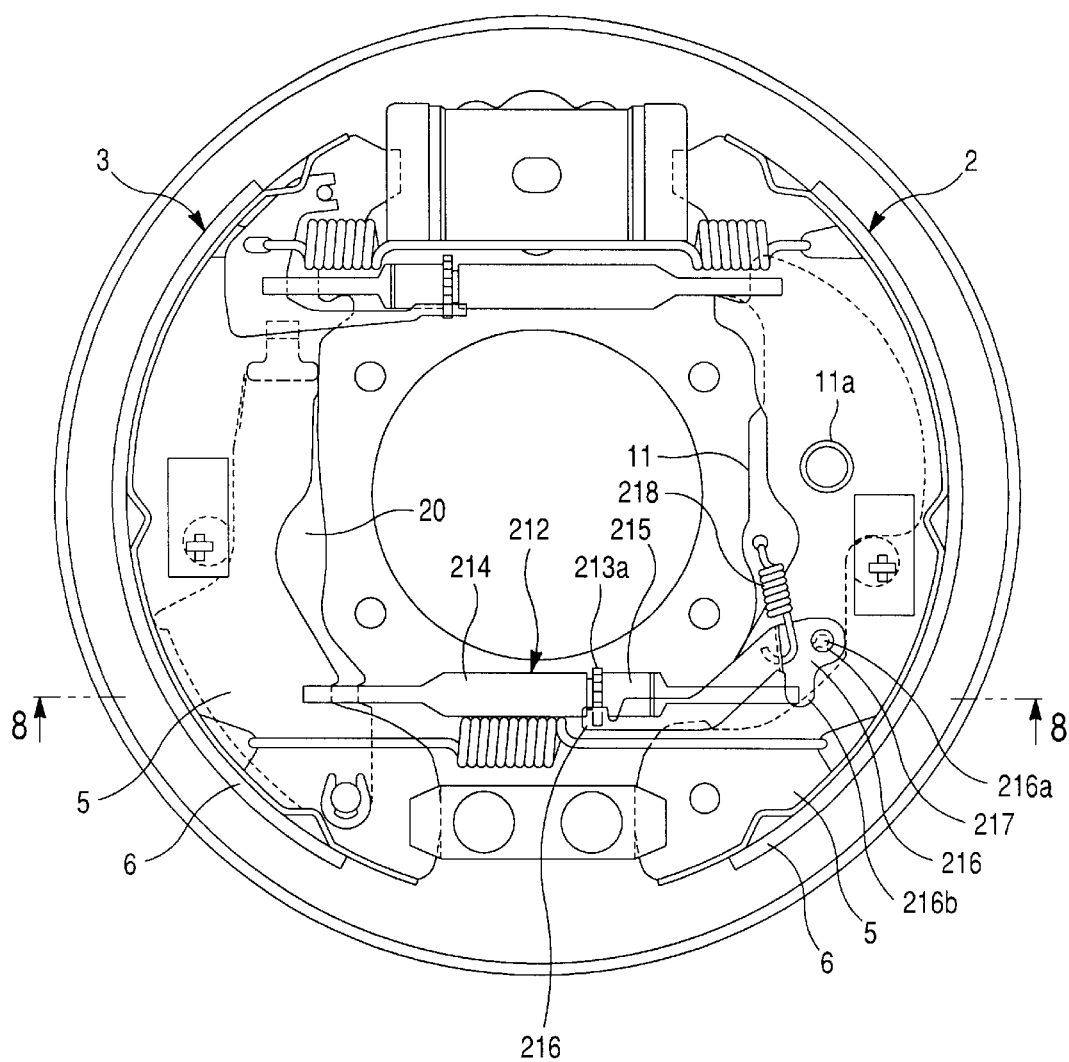
FIG. 7 is a plan view of the drum brake device for the explanation of the modification of the automatic stroke adjustment device.
Figure 8:
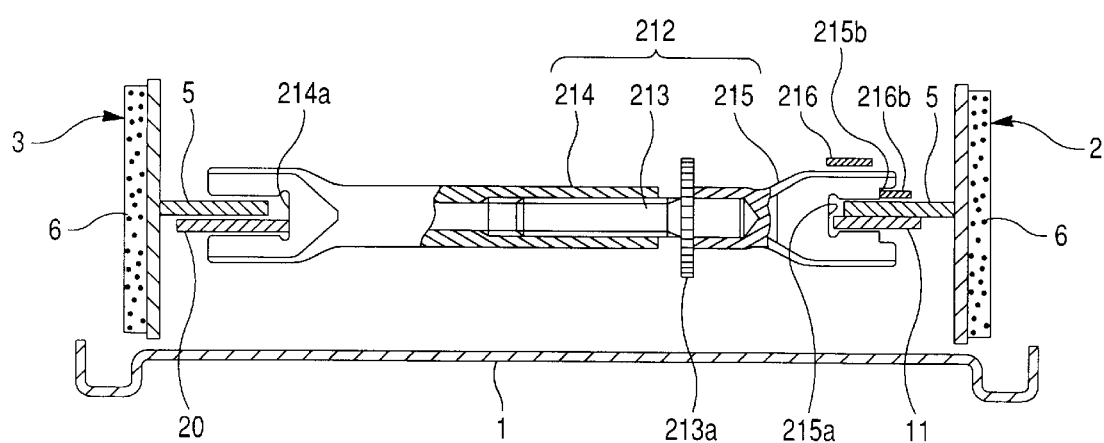
FIG. 8 is a cross-section view of FIG. 7 taken along the line VIII—VIII.

That is, as shown in FIGS. 7 and 8, the second strut 212 comprises an adjustment bolt 213, an adjustment nut 214, and an adjustment sleeve 215. A notched groove 214a of the adjustment nut 214 supports and engages with the shoe web 5 of the brake shoe 3 and the brake lever 20. A notched groove 215a of the adjustment sleeve 215 is provided to support and engage with the shoe web 5 of brake shoe 2 and the pivot lever 11.

Figure 9:
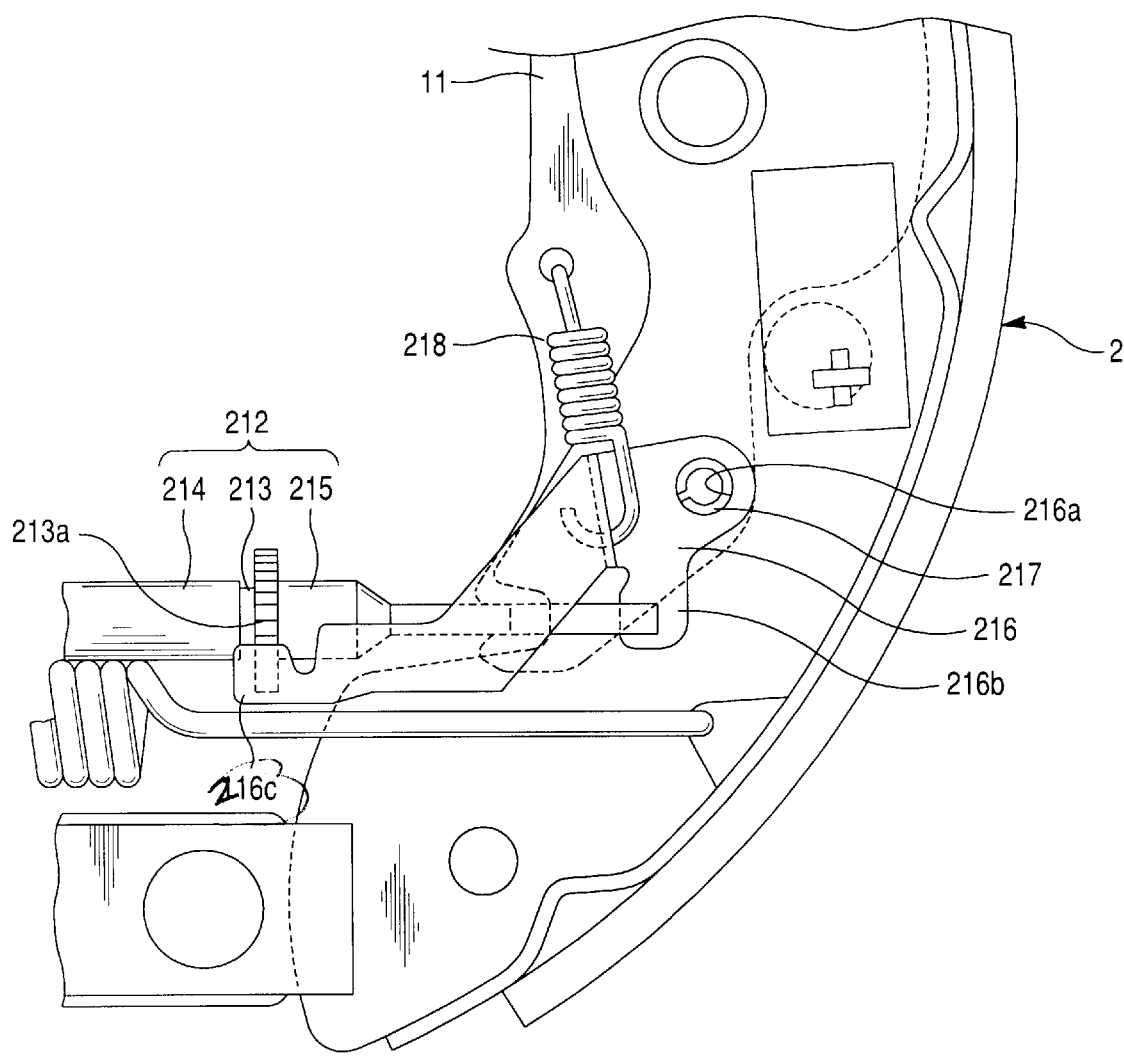
FIG. 9 is an enlarged view of an incremental type automatic stroke adjustment device of FIG. 7.
Figure 10:
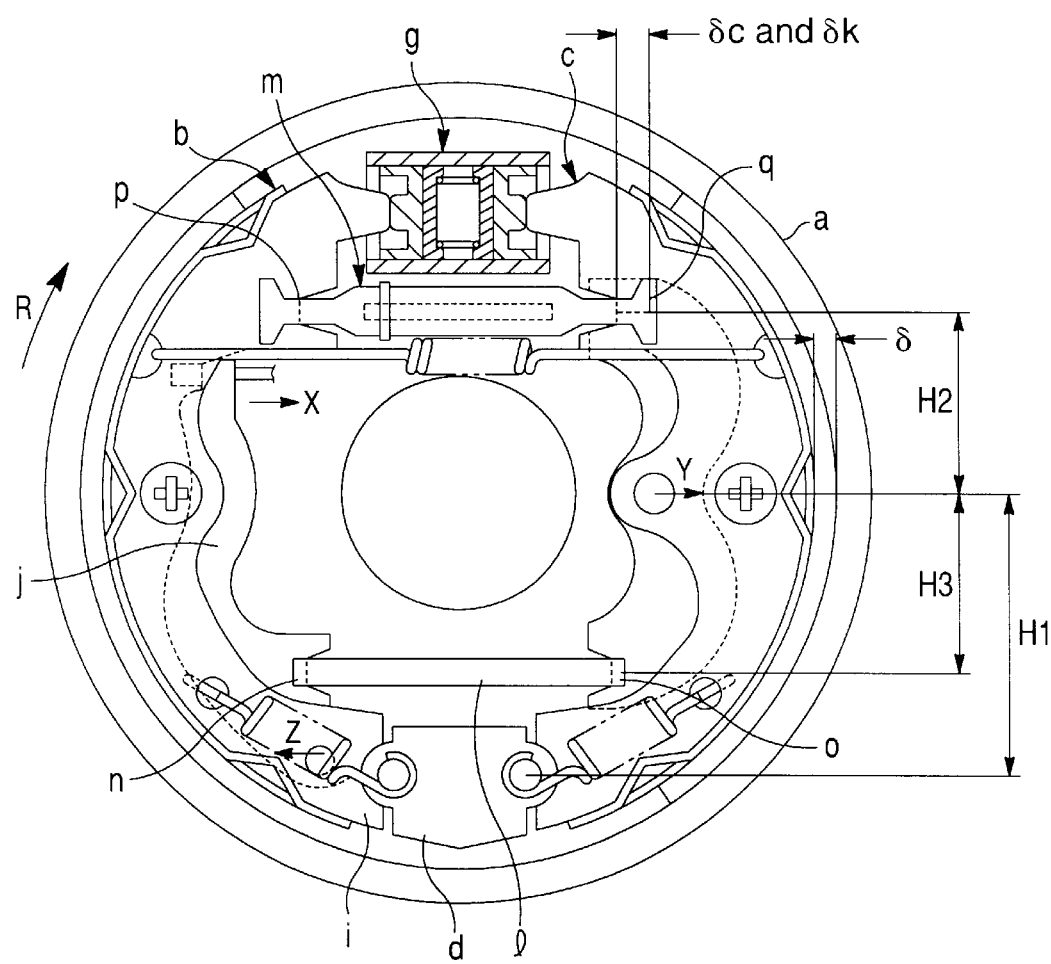
FIG. 10 is a plan view of the first drum brake device on which this invention is based.
Figure 11:
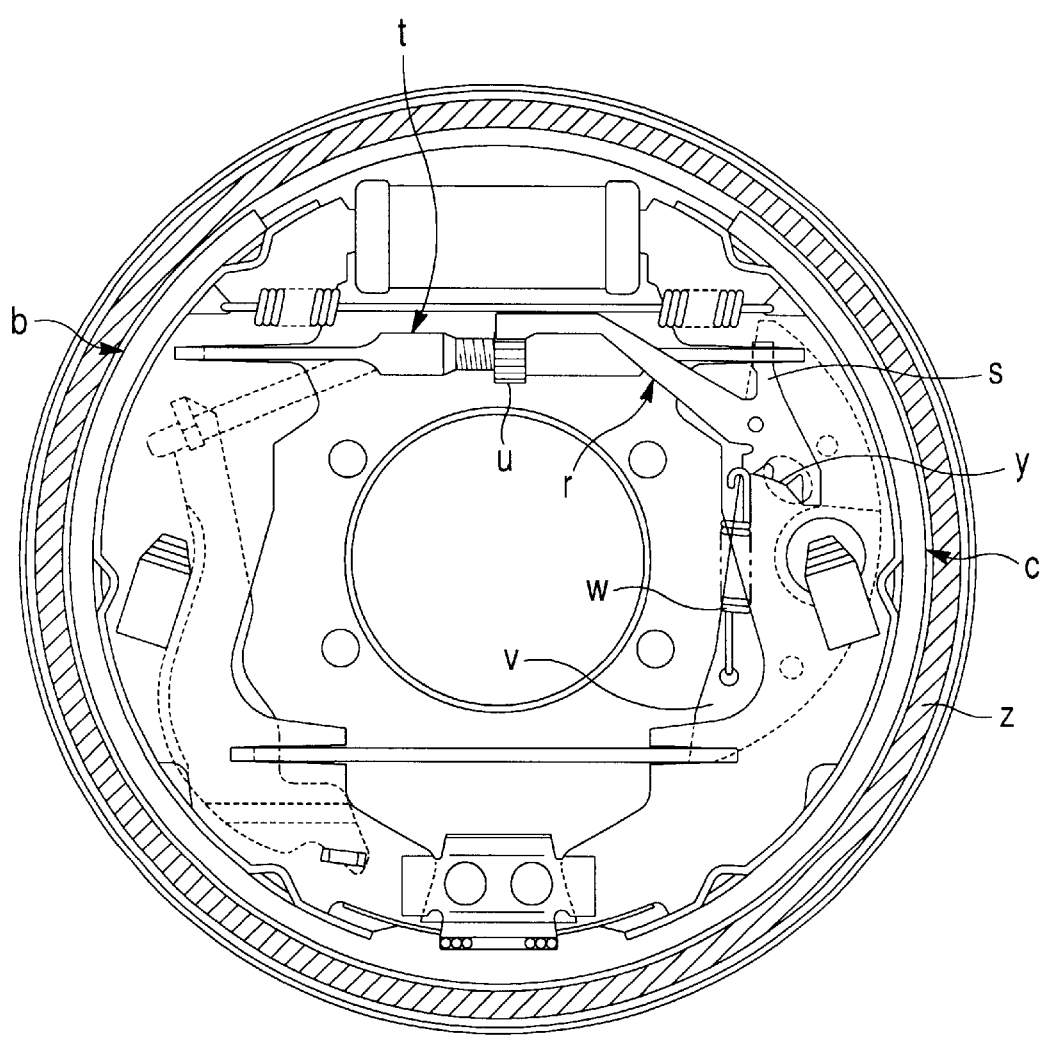
FIG. 11 is a plan view of the second drum brake device on which this invention is based.
Figure 2A:
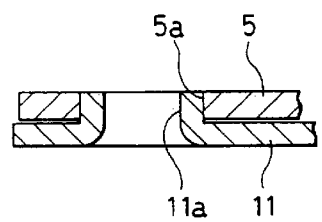
Figure 2B:
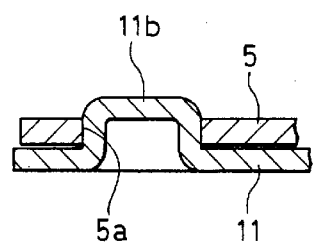
Figure 5:
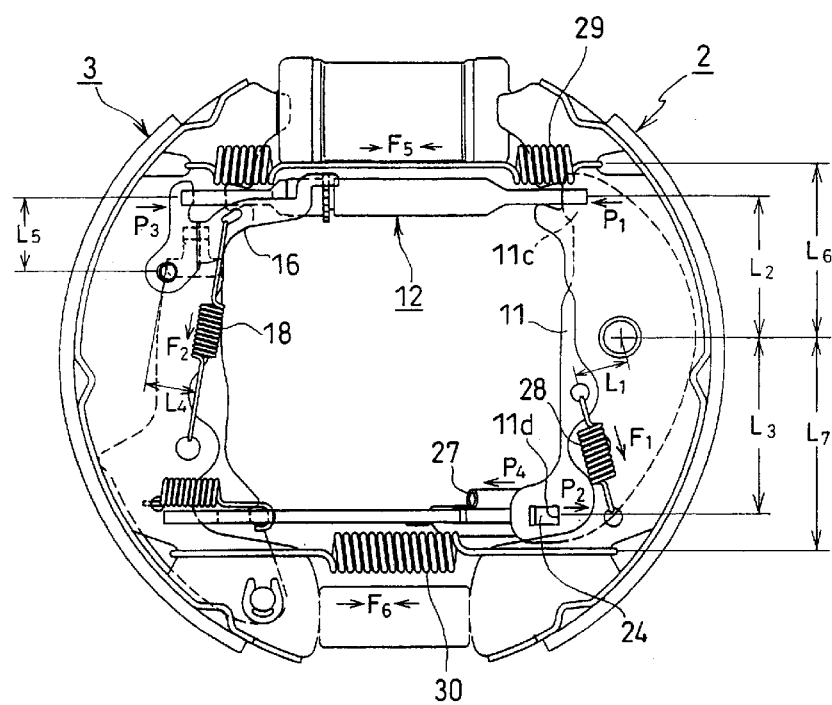
Figure 6:
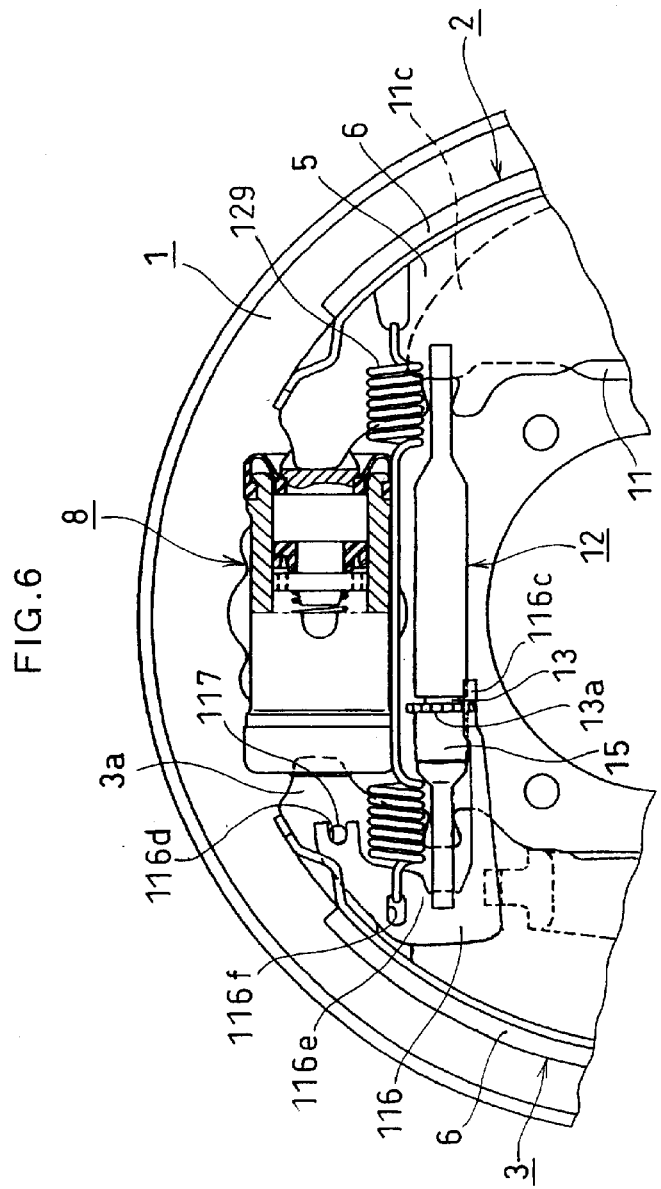
Figure 7:
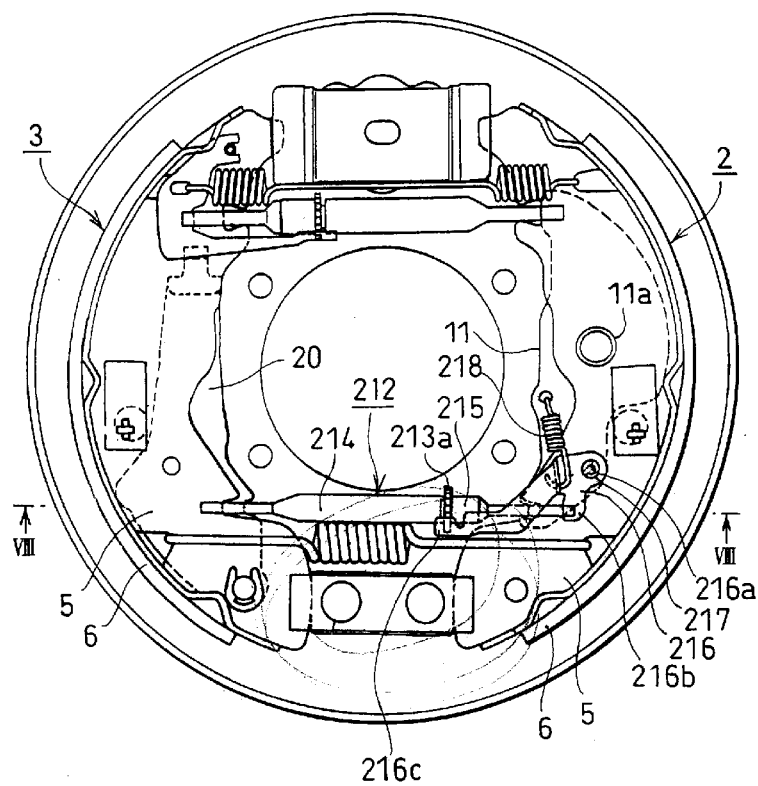
Figure 9:
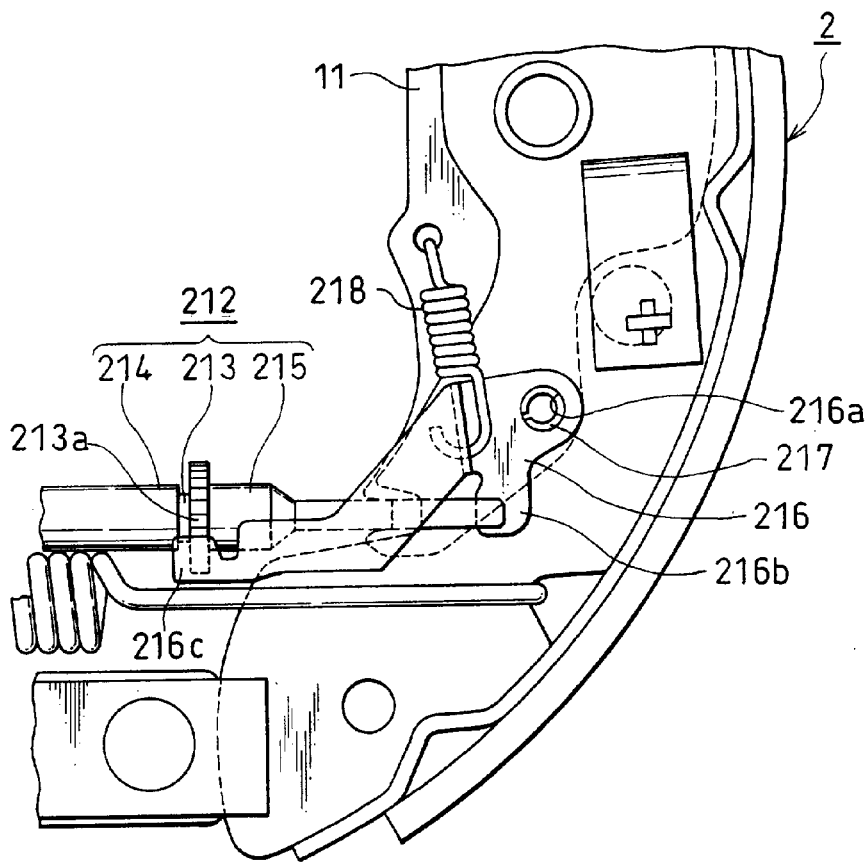
Figure 10:
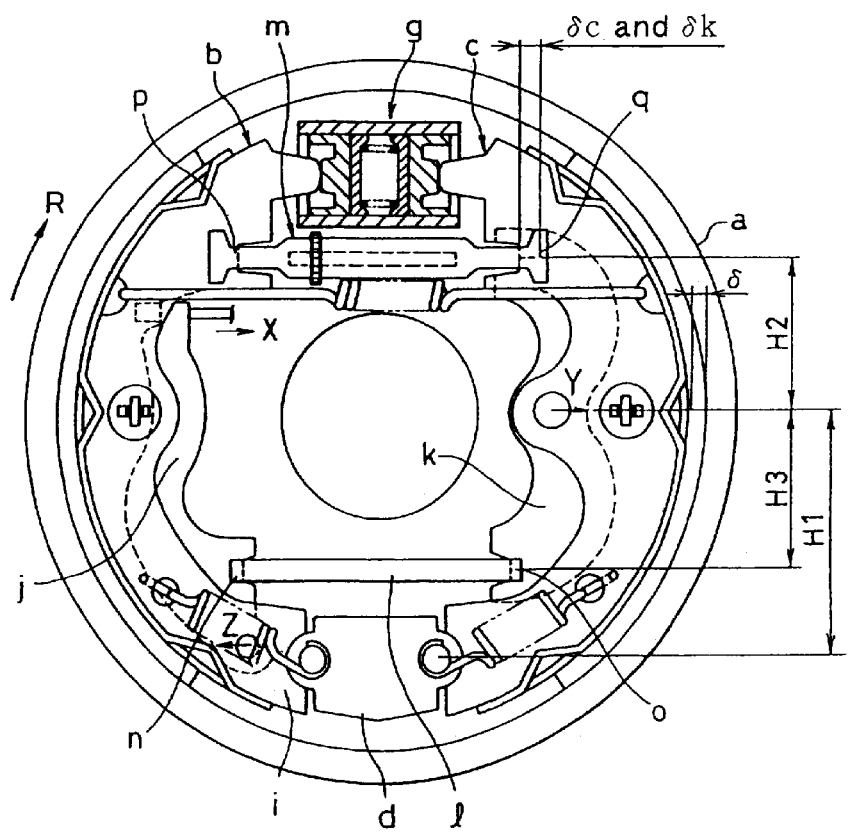
Figure 11:
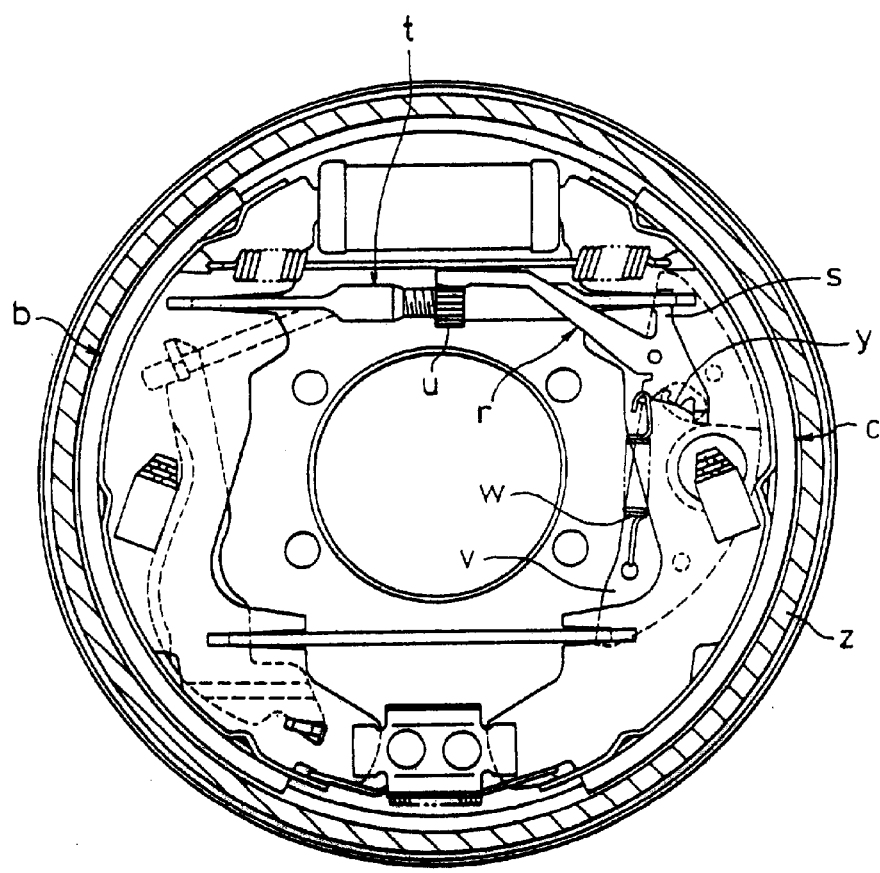

As shown in FIGS. 8 and 9, a hole 216a formed at the pivot point of an adjustment lever 216 is rotatably supported with a spring pin 217 vertically provided on the shoe web 5 of brake shoe 2 as the fulcrum. One arm 216b abuts against a stepped surface 215b of the notched groove 215a of the adjustment sleeve 215, and the other arm 216c engages with the toothed adjustment wheel 213a together with the adjustment bolt 213.

A stroke adjustment spring 218 stretched between the adjustment lever 216 and the pivot lever 11, in FIG. 7, provides the clockwise spring force to the adjustment lever 216 with its pivot point 216a as the fulcrum, and provides the counter-clockwise spring force to the pivot lever 11 with the pivot point 11a as the fulcrum.

Further, the spring force toward the brake lever 20 is to be applied to the second strut 212. A slight clearance equal to a pitch of the toothed adjustment wheel 213a exists between the bottom of the notched groove 215a of the adjustment sleeve 215 and the pivot lever 11, therefore the stroke adjustment spring 218 has the above-described anti-rattle spring function.

When the brake shoes 2, 3 open with the service brake operation, the second strut 212 is biased toward the brake lever 20 side to follow the movement of the brake lever 20. The pivot lever 11 moves together with one brake shoe 2.

At this time, the hole 216a of the adjustment lever 216 engaging the pin 217 moves together with brake shoe 2, and arm 216b of the adjustment lever 216 follows the second strut 212. Therefore, the adjustment lever 216 rotates clockwise according to the extent of such movement.

If the linings 6, 6 are worn and the degree of rotation of the other arm 216c of the adjustment lever 216 exceeds the pitch of the toothed adjustment wheel 213a of the adjustment bolt 113, the adjustment bolt 213 is rotated to stretch the second strut 212 to maintain the constant clearance with the pivot lever 11.

Accordingly, constant stroke of brake lever 20 is maintained, which provides the same type of effects as described in the first and second embodiments such as maintaining fine operation feeling.

This invention is not, by any means, limited to the aforementioned first, second and third embodiments. For example, an incremental type of automatic shoe clearance adjustment device can be substituted for a one-shot type stroke adjustment device if right and left sides are switched. In this situation, the shoe web 5 of the brake shoe 3 is shaped with the rectangular hole, and, simply, the arm 24c of the bell crank lever 24 is freely inlaid in this hole.

Further, a forward-pull type brake lever 20 may be substituted for a publicly known cross-pull type brake lever, and the possibility of many other variations should be evident to those people technically skilled in this industry.

As is evident from the aforementioned configurations, this invention provides the following advantages:

By comprising the automatic stroke adjustment device wherein the pivot lever moves together with one brake shoe when in the service brake operation and it senses the amount of the pivot lever movement to automatically extend the length of the strut for the parking brake, no stroke difference occurs when the parking brake is operated even as the linings wear out. This maintains a long lasting fine operation feeling to the driver.

An automatic stroke adjustment device absorbs the tolerance of all components affecting the brake stroke. Thus, there is no need to specially design to improve the size precision of the related components. This improves the machinability and reduces the cost.

A brake lever stroke distance is maintained for long-period of time, which eliminates a chance of one component interfering other components.

By appropriately designing the mounting load and the mounting location, the ends of the brake shoes may not be separated from the anchor block during the parking brake operation. Accordingly, no noise is generated even when a torque is generated on the brake drum, thus eliminating any discomfort or anxiety for the driver.

No impact load is applied to the anchor block; hence, the strength of its periphery can be reduced to make the device lighter.

An incremental type or one-shot type may be used as an automatic shoe clearance adjustment device and as an automatic stroke adjustment device, which expands the scope of these devices and enables the use of common components.

It is readily apparent that the above-described has the advantage of wide commercial utility. It should be understood that the specific form of the invention hereinabove described is intended to be representative only, as certain modifications within the scope of these teachings may be apparent to those skilled in the art.

Accordingly, reference should be made to the following claims in determining the full scope of the invention.

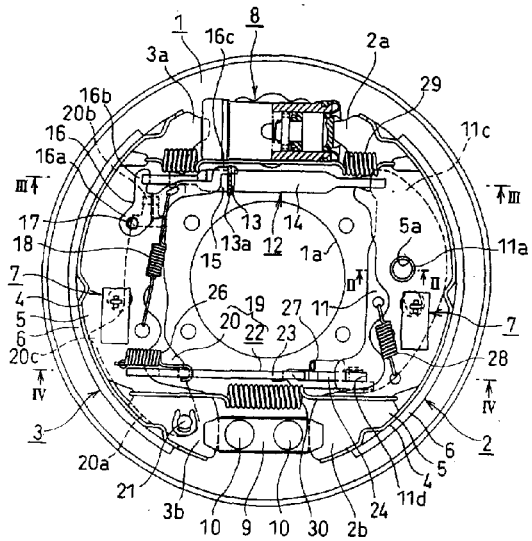

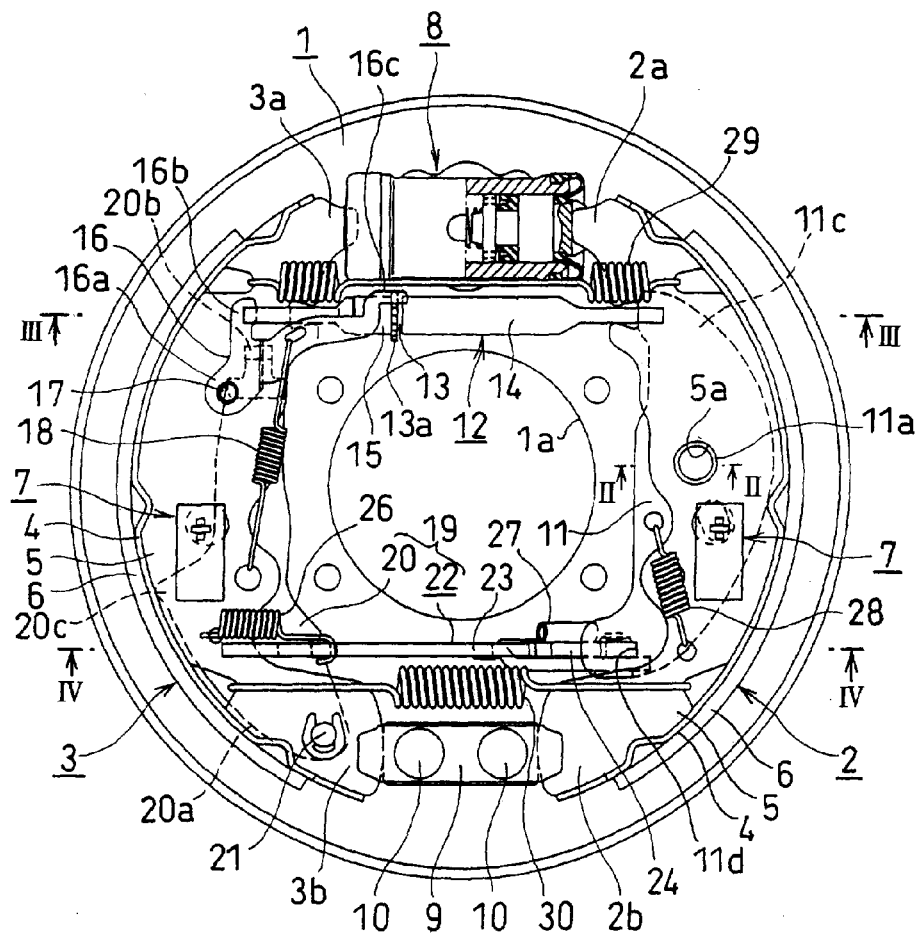

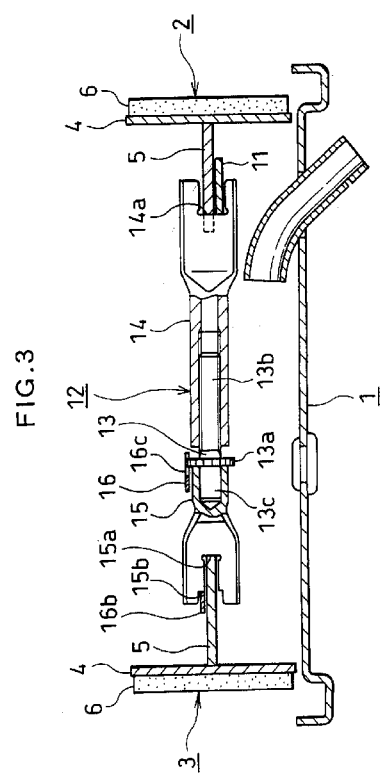

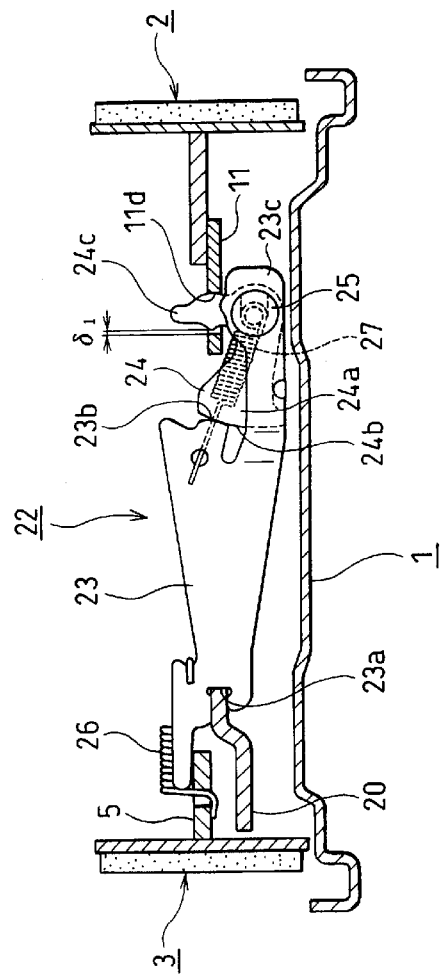

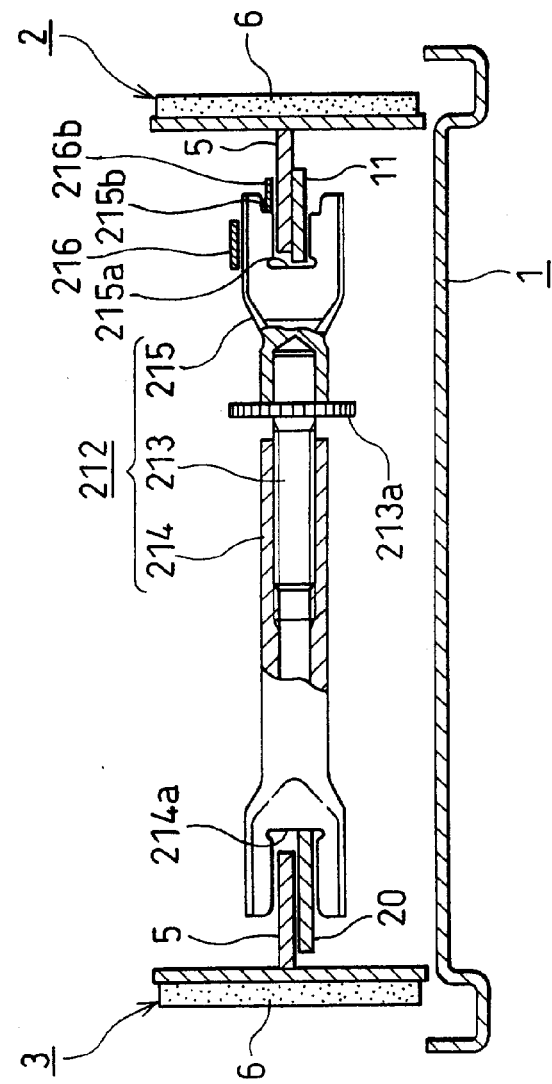

What we claim is:

1. A drum brake device which comprises,
a back plate,
a pair of brake shoes provided to face each other on said back plate,
a service brake actuator, activated upon operation of a service brake, provided between one adjacent end of said pair of brake shoes,
an anchor provided between the other adjacent ends of said pair of brake shoes, a pivot lever pivotably mounted at a pivot point on a central region of one brake shoe as the fulcrum,
an automatic shoe clearance adjustment device, automatically adjusting the clearance between the brake drum and said brake shoes and having a first strut,
said first strut of said automatic shoe clearance adjustment device being provided adjacent to said service brake actuator and between said pair of brake shoes,
a parking brake actuator, activated upon operation of parking brake and having a second strut, provided adjacent to said anchor,
a central region of said pivot lever being rotatably supported about a pivot point at the central region of one brake shoe as the fulcrum,
one end of said pivot lever functionally engaging with said first strut of said shoe automatic clearance adjustment device and an opposite end of said pivot lever engaging with said second strut of said parking brake actuator,
an automatic stroke adjustment device provided on said parking brake actuator to automatically adjust the stroke of said parking brake actuator, and
a spring means provided so that said pivot lever is resiliently biased against said first strut of said shoe automatic clearance adjustment device and so that said pivot lever and said first strut operate together with said one brake shoe when said service brake actuator operates to spread said brake shoes open.

2. A drum brake device as claimed in claim 1, wherein said spring means comprises,
a first spring energizing one end of said pivot lever in the direction to be resiliently biased against said first strut, and
a second spring energizing said first strut in a direction toward said one brake shoe against the force of said first spring, thereby said pivot lever operates simultaneously with said one brake shoe.

3. A drum brake device as claimed in claim 2, further comprising:
an adjustment lever rotatably pivoted on said other brake shoe, said adjustment lever sensing an excessive opening of said pair of brake shoes in service brake operation and automatically extending said first strut of the automatic shoe clearance adjustment device, and wherein
said second spring, which energizes said first strut of the automatic shoe clearance adjustment device in the direction toward said one brake shoe, also energizes said adjustment lever to rotate.

4. A drum brake device as claimed in claim 1, further comprising means for applying an opening resistance force to said one brake shoe with the central region of said pivot lever as the fulcrum when the parking brake is in operation and designed so that said opening resistance force is larger on the other end of said brake shoe than on the one end.

5. A drum brake device as claimed in claim 2, further comprising means for applying an opening resistance force to said one brake shoe with the central region of said pivot lever as the fulcrum when the parking brake is in operation and designed so that said opening resistance force is larger on the other end of said brake shoe than on the one end.

6. A drum brake device as claimed in claim 3, further comprising means for applying an opening resistance force to said one brake shoe with the central region of said pivot lever as the fulcrum when the parking brake is in operation and designed so that said opening resistance force is larger on the other end of said brake shoe than on the one end.

7. A drum brake device as claimed in claim 4, further comprising at least one shoe return spring wherein the moment of said at least one shoe return spring extended between said pair of brake shoes with the central region of the pivot lever as the fulcrum, is designed so that the moment of the other side of said brake shoe is larger than the one side.

8. A drum brake device as claimed in claim 1, wherein a protuberance is integrally formed on one of the central region of said pivot lever or the central region of said one brake shoe by press, and said protuberance is rotatably pivoted in a hole formed in the other of said central region of brake shoe or said central region of pivot lever without the protuberance.

9. A drum brake device as claimed in claim 2, wherein a protuberance is integrally formed on one of the central region of said pivot lever or the central region of said one brake shoe by press, and said protuberance is rotatably pivoted in a hole formed in the other of said central region of said one brake shoe or said central region of said pivot lever without the protuberance.

10. A drum brake device as claimed in claim 3, wherein a protuberance is integrally formed on one of the central region of said pivot lever or the central region of said one brake shoe by press, and said protuberance is rotatably pivoted in a hole formed in the other of said central region of said one brake shoe or said central region of said pivot lever without the protuberance.

11. A drum brake device as claimed in claim 4, wherein a protuberance is integrally formed on one of the central region of said pivot lever or the central region of said one brake shoe by press, and said protuberance is rotatably pivoted in a hole formed in the other of said central region of said one brake shoe or said central region of said pivot lever without the protuberance.

12. A drum brake device as claimed in claim 5, wherein a protuberance is integrally formed on one of the central region of said pivot lever or the central region of said one brake shoe by press, and said protuberance is rotatably pivoted in a hole formed in the other of said central region of said one brake shoe or said central region of said pivot lever without the protuberance.

* * * * *

UNITED STATES PATENT AND TRADEMARK OFFICE
CERTIFICATE OF CORRECTION

PATENT NO.   : 6,302,245 B1
DATED        : October 16, 2001
INVENTOR(S)  : Takashi Ikeda It is certified that error appears in the above-identified patent and that said Letters Patent is hereby corrected as shown below:

The Title page should be deleted and substitute therefore the attached Title page.

<u>Drawings,</u>
Delete drawing sheets 1-11 and substitute drawing sheets 1-11 consisting of Figs. 1, 2A, 2B, 3, 4, 5, 6, 7, 8, 10, and 11 as shown on the attached pages.

Signed and Sealed this

Twenty-fifth Day of February, 2003

JAMES E. ROGAN
*Director of the United States Patent and Trademark Office*

(12) United States Patent
Ikeda

(10) Patent No.: US 6,302,245 B1
(45) Date of Patent: *Oct. 16, 2001

(54) DRUM BRAKE DEVICE

(75) Inventor: Takashi Ikeda, Nagoya (JP)

(73) Assignee: Nisshinbo Industries, Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/295,345

(22) Filed: Apr. 21, 1999

(30) Foreign Application Priority Data

Apr. 22, 1998 (JP) .................................... 10-112217

(51) Int. Cl.⁷ .................................... F16D 51/00
(52) U.S. Cl. .................. 188/79.51; 188/75; 188/78; 188/325; 188/328
(58) Field of Search .................. 188/325, 328, 188/75, 79.51, 78, 79.55, 79.62, 106 F

(56) References Cited

U.S. PATENT DOCUMENTS

| | | | |
|---|---|---|---|
| 3,575,266 | * 4/1971 | Sitchin | 188/106 |
| 4,249,646 | * 2/1981 | Roberts | 188/328 |
| 4,678,067 | * 7/1987 | Thompson | 188/328 |
| 5,000,297 | * 3/1991 | Shaw | 188/156 |
| 5,002,159 | * 3/1991 | Brix | 188/2 D |
| 5,167,304 | * 12/1992 | Capek | 188/325 |
| 5,377,793 | * 1/1995 | Livingston | 188/331 |
| 5,630,486 | * 5/1997 | Maligne | 188/328 |
| 5,720,367 | 2/1998 | Evans | |
| 6,003,645 | * 12/1999 | Asai | 188/328 |
| 6,065,571 | * 5/2000 | Ikeda | 188/79.61 |
| 6,082,505 | * 7/2000 | Asai | 188/79.54 |

FOREIGN PATENT DOCUMENTS 0 836 027 A 4/1988 (EP).
0 800 014 A 10/1997 (EP).

* cited by examiner

*Primary Examiner*—J. J. Swann
*Assistant Examiner*—David Divine
(74) *Attorney, Agent, or Firm*—Liniak, Berenato, Longacre & White

(57) ABSTRACT

A drum brake device which reduces the amount of non-effective stroke (play) and prevents noise for the long period of time. The first strut 12 of an automatic shoe clearance adjustment device is provided adjacent to the service brake actuator 8 and between both brake shoes 2 and 3. The parking brake actuator 19 is provided adjacent to the anchor block 9. The central region of the pivot lever 11 is rotatably supported with the central region of one brake shoe 2 as the fulcrum. Both ends of the pivot lever 11 functionally engage with the first strut 12 and the second strut 22 of the parking brake actuator 19 which comprises an automatic stroke adjustment device automatically adjust the stroke. When the brake shoes are opened by the service brake operation, one end 11c of the pivot lever 11 is elastically supported by the first strut 12 of the automatic shoe clearance adjustment device, and the spring applies spring force so that both pivot lever 11 and first strut 12 operate together with one brake shoe 2.

12 Claims, 10 Drawing Sheets